J. W. GAMBLE.
MEASURING APPARATUS FOR LIQUIDS.
APPLICATION FILED OCT. 28, 1913.
1,170,239. Patented Feb. 1, 1916.
2 SHEETS—SHEET 1.
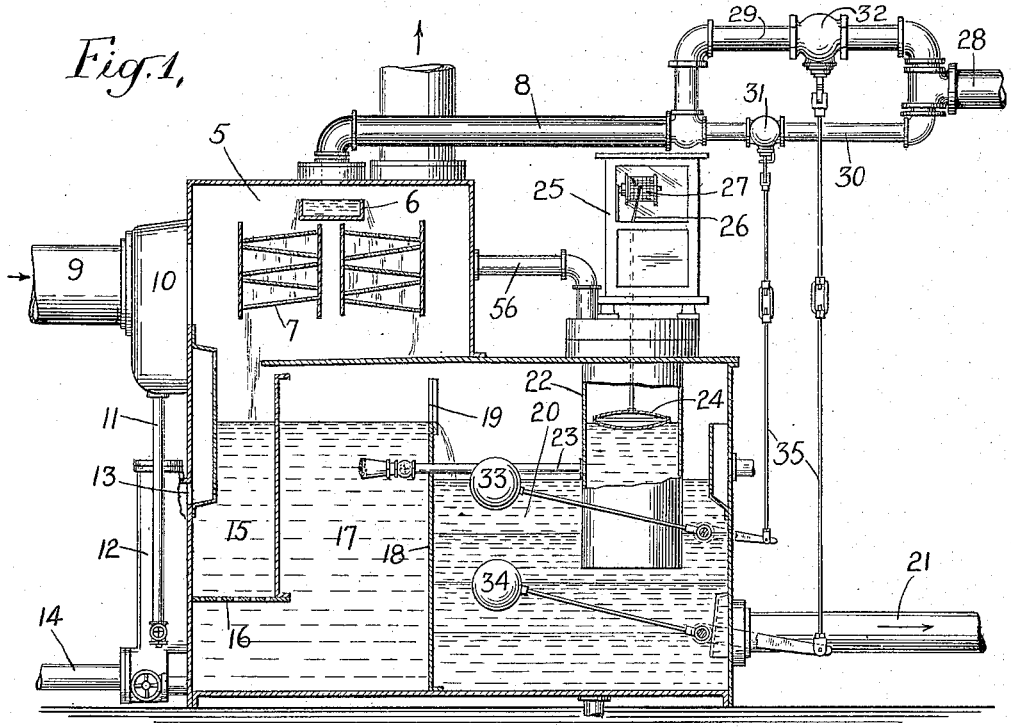
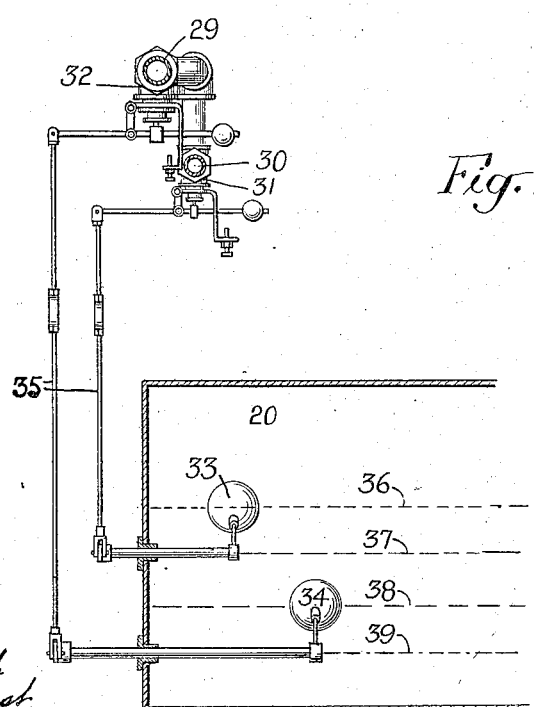

J. W. GAMBLE.
MEASURING APPARATUS FOR LIQUIDS.
APPLICATION FILED OCT. 28, 1913.
1,170,239.
Patented Feb. 1, 1916.
2 SHEETS—SHEET 2.
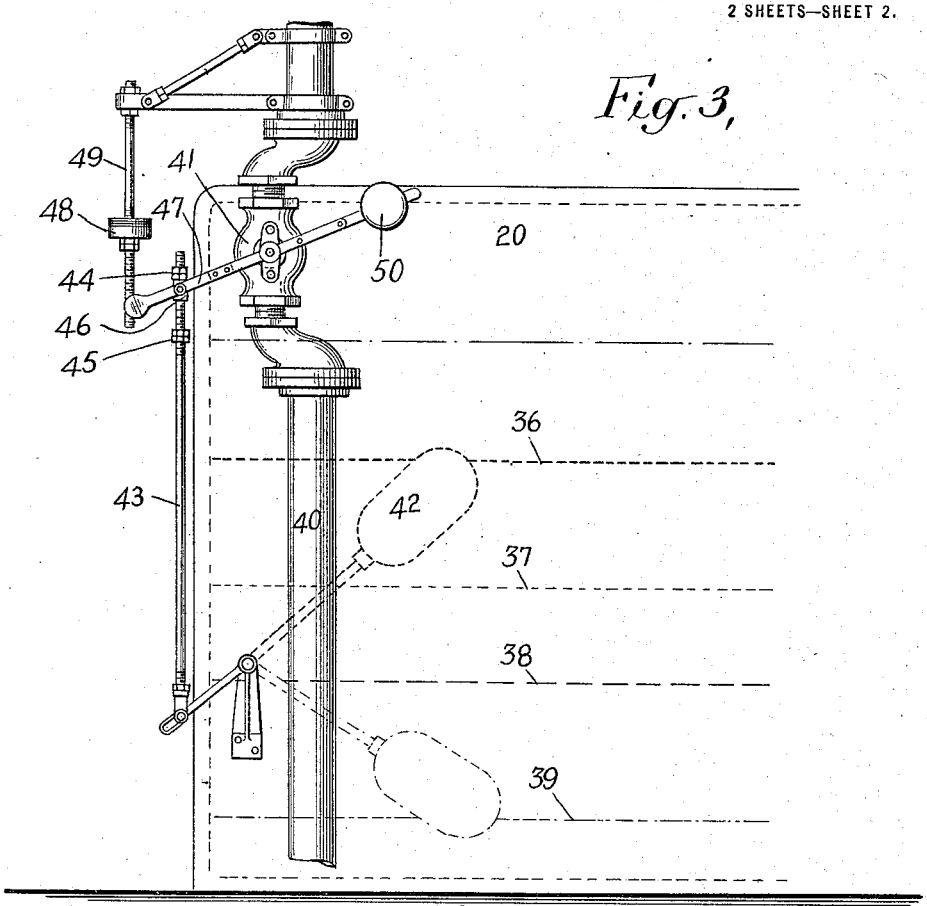
Fig. 3,
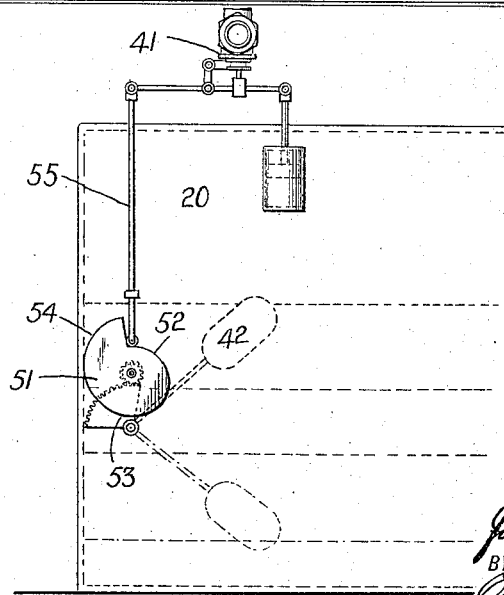
Fig. 4.
WITNESSES
INVENTOR
Joseph W. Gamble
BY
Edwards & Edwards
ATTORNEYS

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A COPARTNERSHIP OF PENNSYLVANIA.

MEASURING APPARATUS FOR LIQUIDS.

1,170,239. Specification of Letters Patent. Patented Feb. 1, 1916.

Application filed October 23, 1913. Serial No. 797,737.

*To all whom it may concern:*

Be it known that I, JOSEPH W. GAMBLE, a citizen of the United States, residing at Philadelphia, in the county of Philadelphia and State of Pennsylvania, have invented certain new and useful Improvements in Measuring Apparatus for Liquids, of which the following is a specification.

This invention relates to apparatus for measuring the flow of water, of particular utility in connection with a heater for heating water to be supplied to steam generating apparatus.

The invention is of special utility in connection with apparatus of the character disclosed in Patent No. 1,015,556, dated January 23, 1912.

In the operation of steam generating and consuming apparatus, it is highly desirable that the water supplied to the steam generating apparatus be measured and it has been the practice heretofore to make such measurement as the water flows from the heater for preliminarily heating the water to the boiler. For this purpose, two chambers have been employed separated by a notched wall constituting a weir over which the water flows from the first chamber to the second and the supply of water to the heater or to the first chamber has been controlled by the level of the water in the second chamber. Also, the desired measurement has been made by measuring the head of the water in the first chamber so as to determine the rate at which the water flows through the notch of the weir.

In using apparatus of this character, it has been found that the record of the water passing through the apparatus has not been as accurate as is desired. The opening of the inlet for supplying water to the heater is not accompanied by a prompt response of the recording instrument and similarly when the inlet is closed, the recording devices will show a record of the supply of water to the heater for an appreciable time after the closing of the inlet.

The present invention is directed to the improvement of apparatus of this character whereby a more accurate and reliable record is obtained of the water supplied by the apparatus to the boiler, whereby the size of the apparatus is materially reduced because a smaller storage capacity for water is rendered sufficient, and whereby the cost of manufacture and the space required for installation are reduced as a result of the decrease in the size of the apparatus. These objects are attained by regulating the admission of water to the apparatus in a particular manner responsive to variations in the level of the water in the outboard chamber on the delivery side of the weir. This manner of admitting water to the apparatus is such that considerable fluctuations in the level of the water in the outboard chamber are prevented, and that the rate of admission of water to the admission side of the weir is at all times more nearly proportional to the rate at which water is withdrawn from the apparatus to the boiler, than in former measuring devices of the character referred to, with which I am familiar. In such former apparatus, employing a single valve for governing the water admission, controlled by a float in the outboard chamber, the regulation of amount of water supplied the apparatus is not, under all circumstances, responsive to the varying demand made upon the apparatus by the boiler. After withdrawal of water at a high rate, for example, with the admission valve wide open, followed by a cessation of the demand, there is a rise of the water on the admission side of the weir while the valve is closing, and while the water which has passed the valve when it closes is reaching the admission chamber of the device. This results in a head of water flowing over the weir greater than is required by the concurrent amount supplied the boiler, and the flow over the weir makes a record higher than is warranted as a record of water supplied the boiler at that time. To overcome to some extent such excessive fluctuations of the water in the outboard chamber as may thus be caused, this chamber has heretofore been made larger than it would otherwise need to be.

By my invention, the admission of water to the apparatus is so controlled that the rate of flow into the admission chamber, and consequently the head of water flowing over the weir at any moment is much more closely proportional to the rate of withdrawal of water from the apparatus, without necessitating so large an outboard chamber as formerly. As the flow over the weir is related to the head of water, from which it is computed, in a V-notch meter, by a well known formula, it is obvious that my invention gives a more accurate record of the water fed to the boiler at all times. By my invention, it may be said that the previous error, due to the lapse of time between the regulating movement of the valve and the entry of water then passing the valve into the admission chamber, is largely overcome. I may accomplish this result by the provision of a plurality of admission valves and governing apparatus for the same, or by a single valve and apparatus for controlling the same in the desired manner, as will subsequently appear.

If the apparatus consists of a heater and a measuring device combined in a unitary structure, then it is the mechanism for admitting water to the heater that is so controlled; but if the apparatus comprises a heater and a measuring device as distinct units though connected together, then either the inlet of water to the heater or the inlet of water to the measuring device from the heater may be so controlled. The invention involves admitting water to the apparatus at an increasing rate as the level of the water in the outboard chamber on the delivery side of the weir falls until that level reaches a predetermined point when the rate of admission of the water is changed. Also, the rate of admission of the water is held substantially constant while the level of the water in the outboard chamber is falling between certain limits and when the level drops below these limits, the rate of admission of the water is increased. The preferred manner of practising the invention involves increasing the rate of supply of water as the level of the water in the outboard chamber falls to a predetermined point, then holding the rate of supply of water substantially constant while the level of the water in the outboard chamber falls from that point to a second predetermined point and again increasing the rate of supply of water as the level of the water in the outboard chamber falls below the second predetermined point. By proceeding in this manner, there is a zone established through which the level of the water in the outboard chamber may fall while the rate of supply of water is maintained substantially constant. In many instances, this rate of supply would be sufficient to make up for water drawn from the apparatus and it would be given ample opportunity to make up for the water drawn off; but if such rate of supply proved insufficient, as would be evidenced by a drop of the level in the outboard chamber beyond a predetermined point, then water would be automatically supplied at a higher rate.

Various constructions may be employed for so affecting the rate of supply of water in the manner above indicated as to secure more accurate records, and I have shown in the accompanying drawings several embodiments of the invention; it will be understood however, that the invention is not limited to any particular construction.

In these drawings, Figure 1 is a sectional elevation of a combined heating and measuring apparatus employing the invention, Fig. 2 is a detail view partly in section of the water supply apparatus shown in Fig. 1, Fig. 3 is an elevation of a modified form of apparatus for practising the invention and Fig. 4 is a view showing a further modification of the invention.

Referring to these drawings, a feed-water heater of the open type is shown at 5. This heater consists of a chamber having a distribution box 6 and a plurality of inclined trays 7 mounted therein. The water supply pipe 8 admits water to the top of the heater so that it is delivered into the box 6 from which it overflows upon the trays 7. Steam is admitted to the heater through the pipe 9 which is connected to a separator 10 for catching oil and water. From the separator 10 oil and water caught thereby drip through a pipe 11 into a trap 12 which is connected to the heater by an opening 13. This trap 12 has a float-operated valve therein which controls the passage of the drip from the separator 10 and the overflow from the heater to waste through a pipe 14. The water heated by the steam rising around the trays 7 accumulates in a chamber 15 at the bottom of the heater 5, which chamber has a perforated baffle 16 at the bottom thereof. If desired, this baffle may be used for the support of filtering material. The water passing through the baffle 16 accumulates in a chamber 17 having a wall 18 at one side thereof which is provided with one or more notches 19 and constitutes a weir over which water may overflow from the chamber 17 to a second chamber 20. Water may be drawn off from the chamber 20 through an outlet pipe 21, which pipe may lead to the boiler-feeding devices. Preferably a pipe 56 connects the heater 5 and the chamber 20 so that the pressure within these two will be the same at all times.

A cylindrical chamber or receptacle 22 is suspended within the chamber 20 and is connected by means of a pipe 23 with the chamber 17 so that the level of the water in the receptacle 22 is always the same as the level within the chamber 17. In this receptacle 22 is a float 24 and mounted above the receptacle and above chamber 20 is a recorder 25 whose marking device 26 is connected to the float 24. This marking device is arranged to mark continuously upon a traveling sheet 27 which is preferably a strip of paper wound around a drum which is driven by a time train.

The water supply pipe is shown at 28. It has two branches 29 and 30, both of which are connected to the pipe 8 which conveys water to the heater 5. In each of the branches 29 and 30 is a valve. The valve 31 in pipe 30 is preferably much smaller than the valve 32 in pipe 29. This valve 31 is operated automatically by a float 33 in the chamber 20. A second float 34 in chamber 20 and mounted at a lower level than the float 33 is adapted to operate the valve 32, suitable links 35 being provided for connecting the floats 33 and 34 with the valves operated thereby. The floats 33 and 34 are so arranged that the level of the water in tank 20 which causes float 33 to open valve 31 the maximum amount is substantially higher than the level which the water must reach before it begins to actuate float 34 so as to open valve 32. As a result of this arrangement of the floats and valves, when the level of the water in chamber 20 falls, there is a substantial period after valve 31 is open the maximum amount before valve 32 is opened at all, during which period the rate of supply of water through pipes 28 and 8 to the heater would be substantially constant.

The important levels of the water in the chamber 20 are indicated by broken lines in Fig. 2. The line 36 indicates the level at which the movement of float 33 to open valve 31 begins and when the water falls to the level, indicated by the line 37, the valve operated by float 33 is open to its full extent. The level of the water in chamber 20 may fall from that indicated by line 37 to that indicated by line 38 without change in the position of valves 31 and 32, the valve 31 being open wide and the valve 32 being closed. The lines 37 and 38 therefore indicate the limits of a zone of constant rate of supply of water to the heater 5. When the level of the water in chamber 20 is within this zone, that is, between the limits 37 and 38, the supply of water to the heater will be substantially constant, the rate being determined by the size or extent of opening of the valve 31. It will be understood that the extent to which this valve 31 may be opened by float 33 may be made adjustable so as to vary the position of the predetermined limit 37 for the constant water supply. When the level of the water in chamber 20 falls below line 38, the float 34 is actuated and the dropping of that level from line 38 to line 39 will cause float 34 to open the valve 32. The rate of supply of water to the heater will thus be increased until float 34 reaches line 39 when valve 32 will be open wide and water will be supplied to the heater at the maximum rate. There is thus provided a means for varying the rate of supply of water to the heater a plurality of times as the level of the water in the second chamber reaches a plurality of different points. The rate of supply of water is held substantially constant when the level of the water in the second chamber is between certain limits, but when that level is either above or below these limits, the rate of supply of water to the heater is automatically varied. This results in far more accurate registration of the quantity of water supplied by the apparatus through the pipe 21. If but one float were employed controlling a single water supply, the drawing off of a substantial quantity of water from chamber 20 would cause this one valve to be opened wide admitting water at a high rate and when the withdrawal of water was discontinued, the supply of water would be maintained for an appreciable time thereafter and might then result in raising the level of the water in chamber 17 higher than is desired, this being followed by a lowering of the level in chamber 17 as water flowed therefrom over the weir. The measuring device would, of course, record this rise and fall of the level in chamber 17 and such record would not be as accurate a record as is desired of the water supplied to the apparatus. With the construction herein described, the provision for the supply of water at a substantially constant rate which is less than the maximum rate, makes it possible to obtain much more accurate measurement records, for the maximum water supply of which the valve 31 is capable is given ample opportunity to make up for water drawn from the apparatus before the larger valve 32 is brought into action and the latter is employed only when its use is made necessary by the withdrawal of an unusually large quantity of water. Furthermore, when valve 32 is used, its use is discontinued before the water in the apparatus is entirely replenished so that the rate of supply of water, after the withdrawal of water has been discontinued, is greatly reduced.

In Fig. 3, I have shown a modified form of apparatus for operating in accordance with the invention. In this apparatus, the water supply pipe is shown at 40 and is controlled by a valve 41 which is preferably a chronometer valve. A float 42 in the second chamber 20 operates the movable member of the valve 41. The lever of float 42 is connected to a vertical link 43 whose upper end is threaded and provided with adjustable nuts 44 and 45. A sleeve 46 encircles the link 42 between these nuts and is pivotally connected to a weighted lever 47 secured to the movable member of valve 41. The end of lever 47 is adapted to engage vertically adjustable weights on a rod 49 suspended from the pipe 40. When the level of the water in chamber 20 falls from the line 36 to the line 37, the float 42 is actuated to raise rod 43 and thus permit the weight 50 on lever 47 to open the valve 41. When the level of the water reaches the line 37, the end of lever 47 engages weights 48 which arrest the movement of lever 47 actuated by weight 50. The level of the water in chamber 20 may then fall from the line 37 to the line 38 unaccompanied by movement of the movable member of valve 41, for as the float 42 moves in response to this drop of the water level the end of rod 43 moves freely upward through sleeve 46. When the water level reaches the line 38, the nuts 45 on rod 43 will have engaged the sleeve 46. Therefore when the water level falls below line 38, rod 43 actuates lever 47 through nuts 45 so as to open the valve 41 wider, the lifting power of the float 42 being sufficient to raise the weights 48, particularly when aided by the weight 50.

With this apparatus, substantially the same results are obtained as with the apparatus shown in Figs. 1 and 2. When the water level in chamber 20 varies between lines 36 and 37, the extent of opening of the valve and hence the rate of supply of water to the heater are varied between relatively low limits; when the level of the water varies between lines 37 and 38, the extent of opening of valve 41 remains unchanged; and when the level of the water varies between lines 38 and 39, the extent of opening of the valve 41 is varied between relatively large limits.

Fig. 4 shows a further modification of the construction, whereby the same results are obtained. In this apparatus, the float in chamber 20 is arranged to actuate a cam 51 having a portion 52 of constantly increasing radius, a portion 53 of substantially constant radius and a portion 54 of constantly increasing radius. This cam 51 actuates a valve 41 in the water supply pipe through a suitable link 55 having a roller at its end which rides on the periphery of cam 51. The operation of this mechanism will be apparent from the foregoing description, the movement of the float actuating the cam, for example, by means of the sector mounted to oscillate with the float and engaging a gear on the shaft of the cam, as illustrated.

In the foregoing I have illustrated embodiments of my invention as employed in connection with a heater and measuring apparatus combined in a unitary structure. This construction, however, is by no means essential to the employment of the invention. The measuring apparatus may be distinct from the heating apparatus, a pipe being provided between the two to carry the heated water from the heater to the measuring apparatus which latter would be divided into two chambers by a wall which forms the weir. The float-operated mechanism in the second chamber of this measuring apparatus would then be arranged to control the admission of water to the heater or the flow of water from the heater to the measuring apparatus as desired. Whether the apparatus be constructed with the measuring apparatus and the heater combined in a single structure as illustrated in the drawings or made as separate units is immaterial so far as concerns the application thereto of the automatic controlling means herein described for automatically regulating the admission of water to the apparatus.

As illustrated in the drawings, the apparatus is provided with three water-receiving chambers in the lower portion thereof, the down-take chamber, the approach or still-water chamber 17 and the outboard or discharge chamber 20. This is the construction which I prefer to employ, though it will be understood that modification in this respect may be made without affecting the utility of my invention, for the employment of the invention requires merely that there be two chambers from one of which the water flows into the other over a weir.

Having described my invention, what I claim as new therein and desire to secure by Letters Patent of the United States is:

1. A combined water heating and measuring apparatus comprising a heater, a water inlet connected thereto, a chamber into which water flows from the heater, a second chamber into which water flows from the first chamber over a weir, and means for increasing the flow of water through said water inlet as the level of the water in said second chamber falls and for varying the rate of such increase when said level reaches a predetermined point, substantially as set forth.

2. The combination of a chamber, a water inlet connected thereto, a second chamber into which water flows from the first chamber over a weir, and means for admitting water to the first chamber through said inlet, for maintaining the rate of admission of such water substantially constant when the level of the water in said second chamber is above a predetermined point and for increasing the rate of admission of such water when the level of the water in said second chamber falls below said point, substantially as set forth.

3. The combination of a chamber, a water inlet connected thereto, a second chamber into which water flows from the first chamber over a weir, and means for admitting water to the first chamber through said inlet, increasing the rate of flow of such water as the level of the water in said second chamber falls, holding the rate of flow of such water substantially constant when said level falls beyond a predetermined point and increasing the rate of flow of such water when said level falls beyond a second predetermined point, substantially as set forth.

4. The combination of two water chambers having a weir between them over which water flows from the first chamber into the second, means for admitting water to the first chamber and means for changing the rate of admission of such water a plurality of times as the level of the water in the second chamber falls to different points, substantially as set forth.

5. The combination of two water chambers having a weir between them over which water flows from the first chamber into the second, and means for admitting water to the first chamber, for increasing the rate of admission of such water as the level of the water in the second chamber falls between predetermined limits and for maintaining the rate of admission of such water substantially constant when the level of the water in the second chamber is between certain limits which are intermediate said first-named limits, substantially as set forth.

6. A combined water heating and measuring apparatus comprising a heater, a water inlet connected thereto, a chamber into which water flows from the heater, a second chamber into which water flows from the first chamber over a weir, and means for admitting water to the heater through the water inlet at a substantially constant rate when the level of the water in said second chamber is between certain limits and for varying the rate at which such water is admitted when the level of the water in the second chamber is either above or below said limits, substantially as set forth.

7. The combination of two water chambers having a weir between them over which water flows from the first chamber to the second, two means for admitting water to the first chamber and two floats in the second chamber each controlling one of said means, substantially as set forth.

8. The combination of two water chambers having a weir between them over which water flows from the first chamber to the second, two pipes connected to the first chamber, a valve in each pipe, and two floats in the second chamber each connected to a valve, said floats being spaced apart so that the position of one float for completing the opening of one valve is above the position of the other float for commencing the opening of the other valve, substantially as set forth.

9. The combination of a water receptacle, means for withdrawing water therefrom, a water inlet therefor, and automatic controlling means for admitting water to said receptacle through said inlet when the level of the water in the receptacle is within certain limits, for holding the rate of flow substantially constant when said level is within certain lower limits and for increasing the supply when said level is below said limits, substantially as set forth.

10. The combination of two water chambers, a weir between them over which water flows from the first chamber to the second, a source of supply of water, a plurality of valves controlling the flow of water from said source to the first chamber, means for automatically opening said valves successively as the level of the water in the second chamber falls and a pipe for withdrawing water from the second chamber, substantially as set forth.

11. The combination of two chambers, a weir between them over which water flows from the first chamber to the second, a pipe for admitting water to the first chamber, valve mechanism in said pipe controlled by the level of water in the second chamber for admitting water through said pipe at an increasing rate as the level of the water in the second chamber falls and for varying said rate of increase when said level reaches a predetermined point, and means for withdrawing water from the second chamber, substantially as set forth.

This specification signed and witnessed this 25th day of October, 1913.

JOSEPH W. GAMBLE.

Witnesses:
ROBERT G. CLIFTON,
M. M. FULTON, Jr.

Copies of this patent may be obtained for five cents each, by addressing the "Commissioner of Patents, Washington, D. C."

It is hereby certified that in Letters Patent No. 1,170,239, granted February 1, 1916, upon the application of Joseph W. Gamble, of Philadelphia, Pennsylvania, for an improvement in "Measuring Apparatus for Liquids," an error appears in the printed specification requiring correction as follows: Page 3, line 127, reference-numeral, for "42" read *43;* and that the said Letters Patent should be read with this correction therein that the same may conform to the record of the case in the Patent Office.

Signed and sealed this 22d day of February, A. D., 1916.

[SEAL.]

Cl. 261-4.

R. F. WHITEHEAD,

*Acting Commissioner of Patents.*